United States Patent
Pranger

(10) Patent No.: US 7,814,016 B2
(45) Date of Patent: Oct. 12, 2010

(54) PERSONAL TELLER SYSTEM AND METHOD OF REMOTE INTERACTIVE AND PERSONALIZED BANKING

(75) Inventor: Eugene P. Pranger, Alpine, UT (US)

(73) Assignee: uGenius IP Holdings, LLC, Salt Lake City, UT (US)

( * ) Notice: Subject to any disclaimer, the term of this patent is extended or adjusted under 35 U.S.C. 154(b) by 997 days.

(21) Appl. No.: 10/880,849

(22) Filed: Jun. 30, 2004

(65) Prior Publication Data

US 2006/0004660 A1 Jan. 5, 2006

(51) Int. Cl.
*G06Q 99/00* (2006.01)
(52) U.S. Cl. ...................................................... 705/42
(58) Field of Classification Search ............... 705/35–40
See application file for complete search history.

(56) References Cited

U.S. PATENT DOCUMENTS

| | | | |
|---|---|---|---|
| 3,876,864 A * | 4/1975 | Clark et al. ................. | 235/379 |
| 4,580,040 A | 4/1986 | Granzow et al. | |
| 4,617,457 A | 10/1986 | Granzow et al. | |
| 4,845,636 A | 7/1989 | Walker | |
| 5,125,465 A | 6/1992 | Schneider | |
| 5,220,501 A | 6/1993 | Lawlor et al. | |
| RE35,184 E | 3/1996 | Walker | |
| 5,592,377 A * | 1/1997 | Lipkin ......................... | 705/42 |
| 5,600,114 A | 2/1997 | Dunlap et al. | |
| 5,604,341 A | 2/1997 | Grossi et al. | |
| 5,732,398 A | 3/1998 | Tagawa | |
| 5,774,663 A * | 6/1998 | Randle et al. ............... | 709/204 |
| 5,872,922 A | 2/1999 | Hogan et al. | |
| 5,929,897 A | 7/1999 | Schneider et al. | |
| 5,933,816 A | 8/1999 | Zeanah et al. | |
| 5,940,811 A * | 8/1999 | Norris .......................... | 705/38 |
| 6,038,553 A | 3/2000 | Hyde, Jr. | |
| 6,073,119 A | 6/2000 | Bornemisza-Wahr et al. | |

(Continued)

FOREIGN PATENT DOCUMENTS

WO  WO 99/08215  2/1999

(Continued)

OTHER PUBLICATIONS

ATMmarketplace.com "Check This" Mar. 12, 2002 http://www.atm-marketplace.com/article_printable.php?id=898&page=1.*

(Continued)

*Primary Examiner*—Thu Thao Havan
*Assistant Examiner*—Thomas M Hammond, III
(74) *Attorney, Agent, or Firm*—Workman Nydegger

(57) ABSTRACT

Systems and methods for providing personalized services to remote customers using personal teller machines (PTM) from a centralized call center. The customer initiates the transaction providing identification at a PTM. The identification of the customer is verified and audio and/or video communication is established between the customer at the PTM and a teller at a teller station in the call center. Upon establishment of video and audio connection, the customer may request the performance of specific financial transactions that are controlled by a teller through the teller station that is connected with the PTM over a network. Upon completion of the transactions of the customer by the teller, a receipt is printed for the customer and the video and audio connections are closed.

23 Claims, 19 Drawing Sheets

U.S. PATENT DOCUMENTS

| | | | |
|---|---|---|---|
| 6,085,177 | A | 7/2000 | Semple et al. |
| 6,195,694 | B1 | 2/2001 | Chen et al. |
| 6,219,087 | B1 | 4/2001 | Uiterwyk et al. |
| 6,223,983 | B1 | 5/2001 | Kjonaas et al. |
| 6,349,290 | B1 | 2/2002 | Horowitz et al. |
| 6,354,490 | B1 | 3/2002 | Weiss et al. |
| 6,518,994 | B1 | 2/2003 | Johnson et al. |
| 6,539,361 | B1 | 3/2003 | Richards et al. |
| 6,704,039 | B2 | 3/2004 | Pena |
| 6,725,303 | B1 | 4/2004 | Hoguta et al. |
| 6,760,414 | B1 | 7/2004 | Schurko et al. |
| 6,968,321 | B1 | 11/2005 | Yu |
| 7,438,222 | B2 | 10/2008 | Green et al. |
| 7,542,944 | B1 * | 6/2009 | Drummond et al. ........... 705/43 |
| 7,568,615 | B2 | 8/2009 | Corona et al. |
| 7,606,767 | B1 | 10/2009 | Couper et al. |
| 2001/0007332 | A1 | 7/2001 | Kjonaas et al. |
| 2003/0023555 | A1 | 1/2003 | Rees |
| 2003/0046231 | A1 | 3/2003 | Wu |
| 2003/0179287 | A1 | 9/2003 | Kozic et al. |
| 2003/0212637 | A1 | 11/2003 | Turner |
| 2004/0016796 | A1 * | 1/2004 | Hanna et al. ................ 235/375 |
| 2004/0169722 | A1 | 9/2004 | Pena |
| 2005/0100160 | A1 | 5/2005 | Bae |
| 2009/0222358 | A1 | 9/2009 | Bednarek |

FOREIGN PATENT DOCUMENTS

| | | | |
|---|---|---|---|
| WO | WO 99/12086 | | 3/1999 |
| WO | WO 00/49552 | | 8/2000 |
| WO | WO 01/37136 | A2 | 5/2001 |
| WO | WO 02/05176 | A1 | 1/2002 |
| WO | WO 03/010702 | A1 | 2/2003 |

OTHER PUBLICATIONS

Kenneth Kiesnoski, *Despite Technical Woes, Old National Sees Potential for Video Banking; Industry Trend or Event*, Thomson Corporation Company, Jan. 1, 1999, Section No. 1, vol. 36, p. 54; 1045-9472.

Orla O'Sullivan, *Tellers Play TV Anchor*, Video Banking, nFront, 1997.

Christy Tauhert, *Video Kiosks, ATMs or both?*, Gralla Publications, Apr. 1996, Section vol. 33, No. 4, p. 30, ISSN: 1045-9472.

Steve Onufrey, *Creating the Cross Channel Experience*, presentation presented to the Community Bankers Council, 2003.

*Banks Increase Call Center Deployment, Video Conferencing Makes Its Way to the Call Center*, Phillips Business Information, Inc, Oct. 1, 1997, vol. 9, No. 19.

John Studdard, *Virtual Bank Supports Rapid Call Center Expansion with Cisco IP Communications Solution*, Cisco Systems Company Profile, 2003.

Diebold Website, *Remote Teller™ System*, www.diebold.com/oppssol/transactionsys/remote_teller.htm, May 2004.

* cited by examiner

PERSONAL TELLER SYSTEM AND METHOD OF REMOTE INTERACTIVE AND PERSONALIZED BANKING

CROSS-REFERENCE TO RELATED APPLICATIONS

Not applicable.

BACKGROUND OF THE INVENTION

1. The Field of the Invention

The present invention relates to systems and methods for providing remote services. More particularly, embodiments of the invention relate to providing personal and interactive services between a customer located in a retail location and a service provider located in a remote centralized call center.

2. Background and Relevant Art

Financial institutions face a number of challenges in providing banking services to their customers. One of those challenges is providing fast, personal, and economically efficient service to their customers. Traditional walk-up teller windows provide personal service, but are often slow for the customer and an economically inefficient solution for the financial institution. Because of the peaks and valleys of customer demand throughout a day, financial institutions often have of idle tellers.

In an attempt to reduce staffing costs, financial institutions turned to installing automated teller machines (ATM), both at the financial institution itself as well as in a variety of retail locations. The latest ATM's are capable of addressing a wide variety of a customers financial transaction needs. However, ATM's do not address the desire of many customers to have a personal/human relationship with their financial institution.

Other attempts to provide more efficient yet personal human-to-human banking have been made. For example, Remote Teller Systems have been developed that allow for closely located (up to 400 feet away) tellers to handle multiple customer transactions using pneumatic tubes for transference of checks and other materials between the customer and the teller. Although this system enhances economic efficiency for the financial institution, the tellers are still required to be closely located to the customer and the tellers can still only serve one branch's customers. Thus, the financial institution will still face teller idleness associated with the peaks and valleys of customer demand on that particular branch.

Although banking methods are continuously diversifying, nearly 80% of people still use a branch at least occasionally and 58% of people feel that branch transactions will continue to be a main method of contact with their bank in the coming years. In general, 68% of people who visit a branch for their banking needs do so to have personal/one to one contact and 35% of people visit a branch because they like to know whom they are dealing with. Financial institutions will continue needing fast, personal, economically efficient service for customers. In other works, personal service and economic efficiency are two key yet seemingly conflicting elements to performing bank services.

BRIEF SUMMARY OF THE INVENTION

These and other limitations and problems are overcome by embodiments of the present invention, which relate to systems and methods for providing personal services. Embodiments of the invention are capable of fulfilling the need of financial institutions for fast personal human-to-human service in an economically efficient and viable manner. One aspect of the present invention allows a customer to effectively participate in any financial transaction normally accomplishable with a traditional walk-up teller arrangement while allowing the teller involved in the transaction to be located at a separate centralized location where the teller can serve multiple retail locations.

In one embodiment, a system includes PTMs that are geographically dispersed. Each PTM is connected with a server computer that receives calls or broadcast messages from the PTMs when a customer initiates a transaction. The calls are placed in a caller queue. The server then notifies tellers at the call station that a call from a customer is available through the teller machines of the tellers.

When a teller accepts a call, the teller typically has control of the transaction. The ID provided by the customer is verified and audio and/or video communication is established. The audio communication and video communication can occur over the same network or over different networks. For example, a video feed may include the video and/or audio data. Alternatively, the audio data may occur over the telephone network while the video data is transmitted over the Internet.

Thus, the PTM includes a handset and a camera to generate the audio and video data transmitted to the teller machine and the teller machine has similar components to provide the customer with audio/video data of the teller. This enables the customer to request transactions audibly, for example, that are performed remotely by the teller.

The PTM has other components to facilitate transactions including, but not limited to, a display for displaying a customer transaction screen that includes details about the transaction. This provides visual verification to the customer regarding details of the transaction. The customer transaction screen is typically adapted to the specific transaction. The PTM may also have a document acceptor to receive documents, a scanner to scan images of the documents that are then transmitted to the teller machine for visual inspection by the teller. The PTM also includes a bill acceptor, a change dispenser, an electronic signature pad, and other components that enable multiple transactions to be completed in a personalized manner.

The customer receives a personal service from a teller. The financial institution that controls the call center can reduce costs by consolidating tellers into a single location. Thus, the number of tellers is reduced, teller idle time is also reduced, and as a result, efficiency is improved while still providing a personal service to customers.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to systems and methods for providing remote services. The present invention is further related to systems and methods for providing personal interactive banking services. Embodiments of the invention enable a service provider such as a bank to increase the efficiency of employees and still provide personal service to customers.

Figure 1:
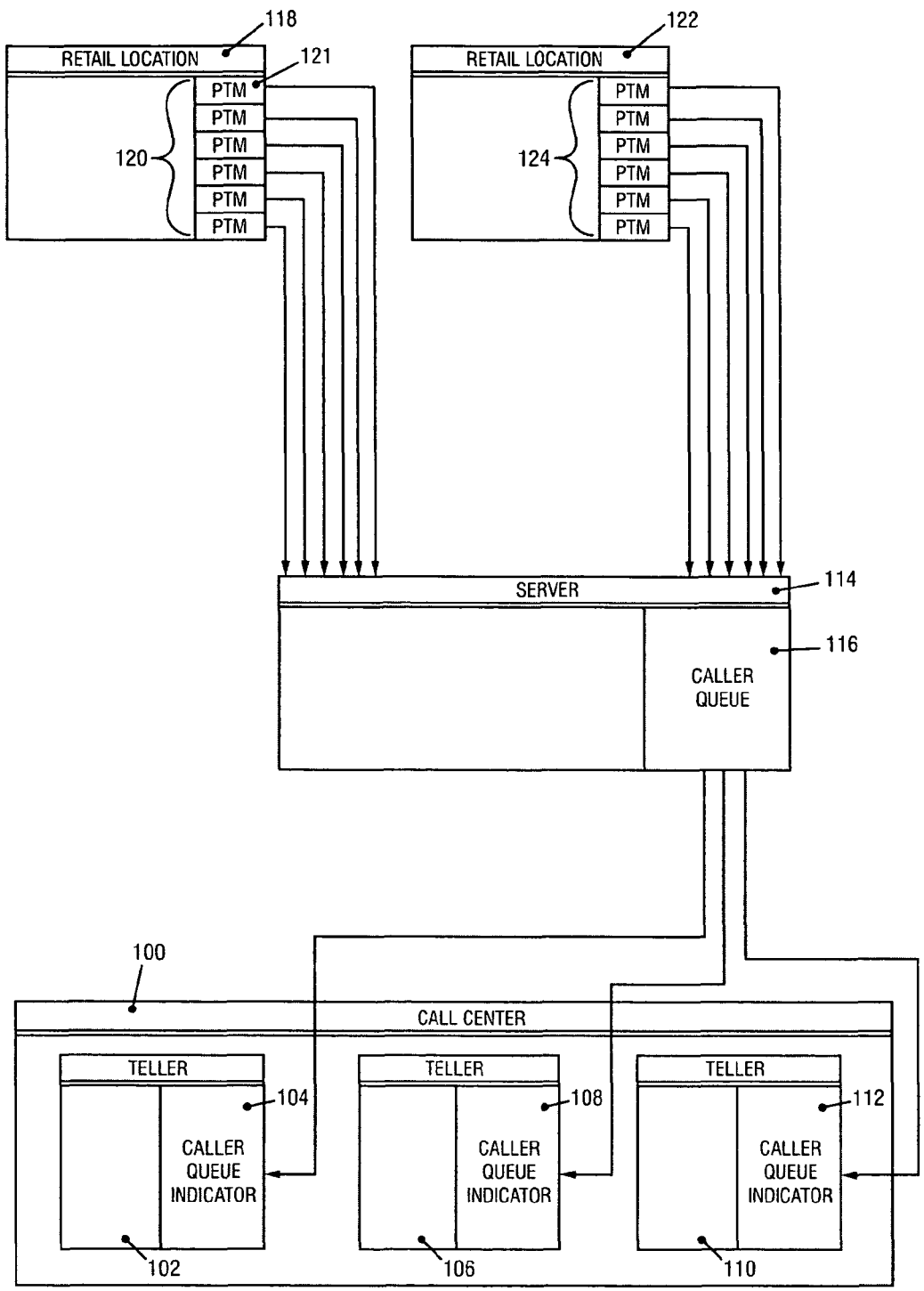
FIG. 1 is a general schematic view of the Personal Teller System which includes, in this embodiment, several PTMs located at multiple retail locations, a server having a caller queue, and several teller stations located in a centralized call center.

FIG. 1 is a block diagram illustrating embodiments of the invention as well as an environment for implementing embodiments of the invention. FIG. 1 illustrates a call center 100. Tellers 102, 106, and 110 work at the call center 100. Each teller can operate a computer that typically includes a caller queue indicator such as the caller queue indicators 104, 108, and 112. The call center 100 is connected over a network to a server 114. The server 114 maintains a caller queue 116.

The server 114 is also connected to one or more personal teller machines (PTMs) 120, 124, which are located at retail locations 118, and 122, respectively. In this example, customers use the PTMs 120, 124 to perform transactions with their financial institution. Embodiments of the invention enable the transactions to have a personal aspect by causing the customer to interact with a teller at the call center 100. This interaction can be at least audial and/or visual.

The PTMs 120, 124 at the retail locations 118, 122 are usually remotely located from the call center 100 and from each other. Embodiments of the invention enable a financial institution (or other provider) that maintains the call center 100, however, to provide customers with a personal experience while reducing their own costs at the same time. As previously described, the customers that a single branch can serve are limited and the tellers employed at that branch may experience idle time when no customers are present. By consolidating the tellers at the call center 100, the tellers not limited to serving customers at a particular geographic location. As a result, the call center can increase the efficiency of the tellers, thereby reducing costs.

In an exemplary method for providing services to customers, a server 114 typically receives a request or call from a PTM 121 over a network such as the Internet, a telephone network or other wired and/or wireless network. The request is initiated by a customer that interacts with the PTM 121 to begin a transaction. The server 114 places the request or call in a caller queue 116 and provides this information to the call center 100 over a similar network. Each teller at the call center 100 may have a caller queue indicator such that each customer is served in turn.

When a teller 102 selects a call or request from the queue 116, then a connection can be established between the PTM being used by the customer and a computer of the teller 102. The connection may or may not occur through the server 114. Typically, the connection includes a video link that enables the customer to see and hear the teller. The teller may also be able to see and hear the customer over the video link. In another embodiment, the audio link and the video link may be separate links. In this example, the transaction is initiated by the customer at a PTM 121, but the PTM 121 is thereafter controlled by the teller at the call center.

At the teller machine, the customer can then select an appropriate transaction that is transmitted to the teller. The teller can process the transaction and the customer is provided with verification that the transaction occurred. Advantageously, the customer has a personal interaction with the tellers of the financial institution and the tellers at the call center are able to serve customers at geographically dispersed locations.

Thus, the present invention relates to systems and methods for providing personal interactive banking services (i.e. withdrawals, cash and check deposits, finds transfers, cashing of checks, etc.) between a customer located in a retail location (i.e. tradition financial institution, grocery store, airport, mall, college campus, corporate center, manufacturing plant, stand alone kiosk, etc.) and a teller located in a centralized teller/call center.

Each PTM is independently accessible to serve multiple customers. The PTM platform is space and volume optimized to fit in traditional financial institutions, 24 hour vestibules, grocery stores, airports, malls, college or university campuses, corporate centers, manufacturing facilities, stand-alone kiosks, and any public places frequented by current or potential customers. The PTMs allow the remotely located tellers to service customers at multiple retail locations from one centrally located call center.

Figure 2:
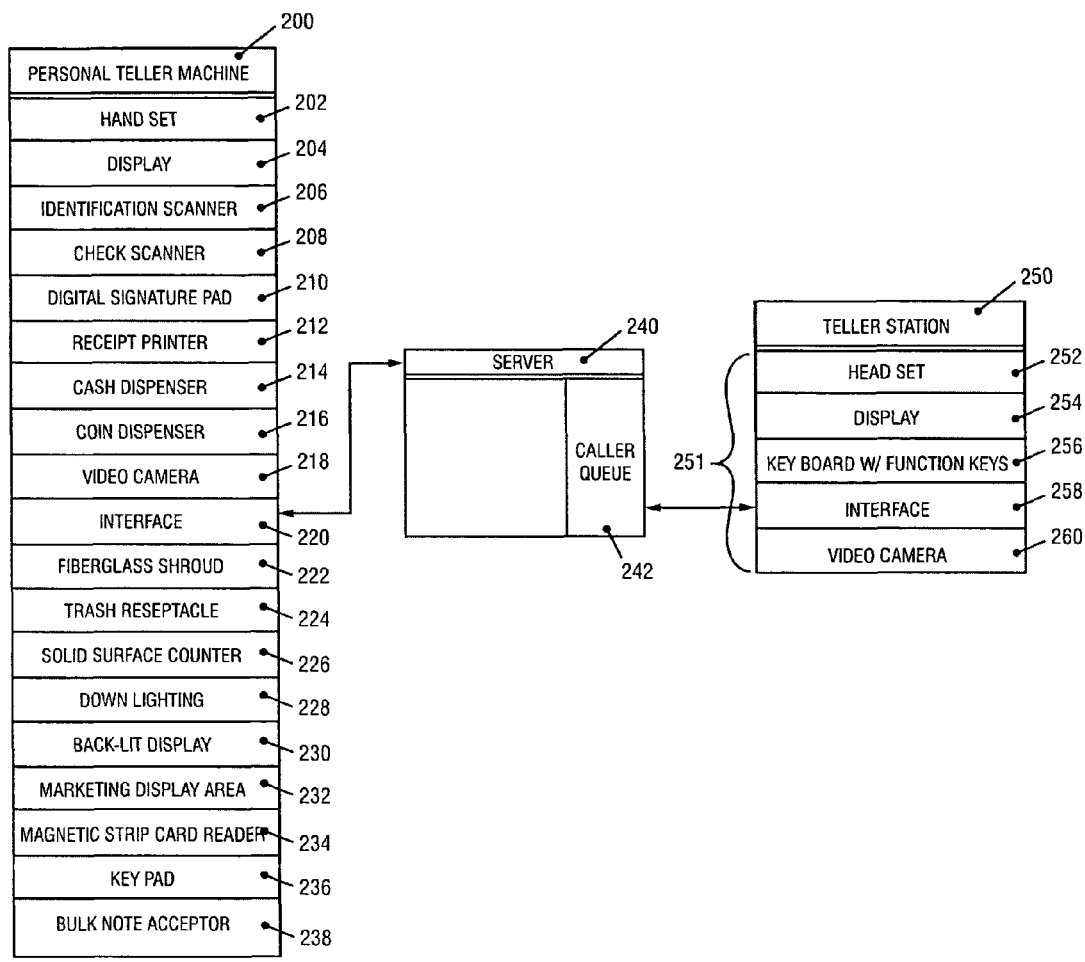
FIG. 2 is a general schematic showing how the PTM and teller station are connected and the components of the PTM and teller station.

FIG. 2 is a block diagram that illustrates another embodiment of a PTM and of a teller station at a call center. In this embodiment, the PTM 200 includes various components 201 that enable a customer to use the services provided by a bank. The PTM 200 includes components 201 that include, by way of example and not limitation, a hand set 202 for audio communications, a display 204 for visual communications, an identification scanner 206, a check scanner 208, a digital signature pad 210, a receipt printer 212, a cash dispenser 214, a video camera 218, an interface 220, a fiberglass shroud 222, a trash receptacle 224, a counter 226, down lighting 228, a display 230, a marketing display area 232, a magnetic strip card reader 234, a key pad 236, and a bulk not acceptor 238. These components 201 enable a customer to have a personal experience with a teller at the teller station 250 while enabling the customer to remote perform transactions.

The teller station 250 has components 251, by way of example and not limitation, that include a head set 252, a display 254, a key board 256, an interface 258, and a video camera 260. The teller station 250 and the PTM 200 also include a computer that can each communicate with the server 240 over a network. The components 201 of the PTM 200 and the components 251 of the teller station 250 may be integrated with a computer or may connect with the computer to provide the indicated functionality.

When a customer initiates a connection or call with a teller, the PTM 200 connects with the server 240 and the call is placed in the caller queue 242 as previously described. The caller queue is accessed in turn by the tellers. Thus, the customer is connected with a teller and the components 201 and the components 251 enable the customer to have a personal experience with a teller. For example, the video camera 218 and the video camera 260 enable the customer to view the teller and the teller to view the customer. Audio can be similarly transmitted via the hand set 202 of the customer and the head set 252 of the teller. Other of the components 201 are used, for example, to identify the type of transaction, verify the customer's identify, receive payments (currency, checks, coin, etc.), and the like or any combination thereof.

Figure 3:
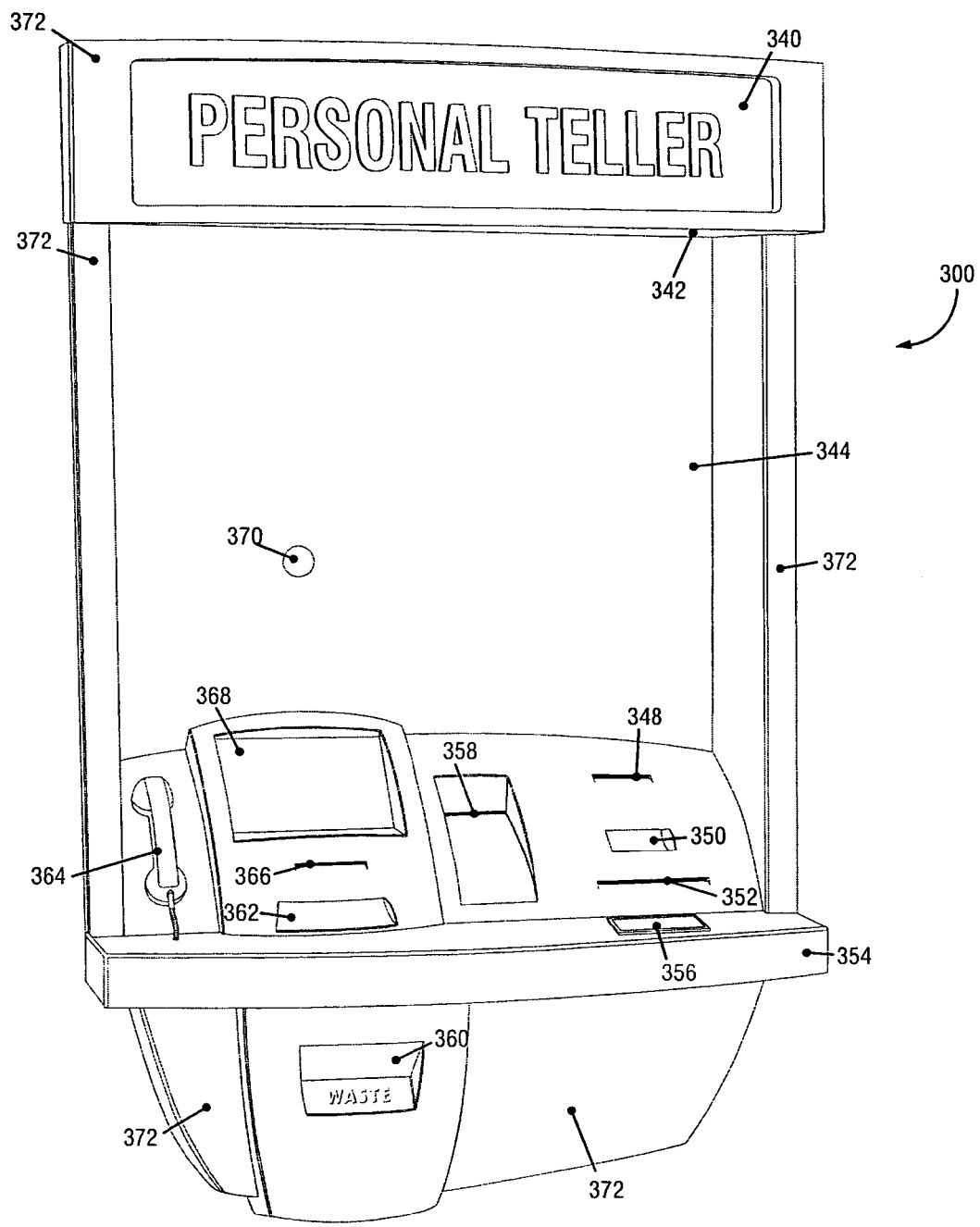
FIG. 3 is a general view, in perspective, showing a preferred embodiment of the Personal Teller Machine as part of the invention system.

FIG. 3 illustrates a perspective view of a PTM 300 and is an example of the PTM 200 shown in FIG. 2. A fiberglass shroud 372 generally forms the fascia structure of the PTM 300. The PTM 300 incorporates an illuminated indication sign 340 as well as a large merchandising display 344 lit by undermounted lighting 342. Both the indication sign 340 and the merchandising display 344 serve to attract customers to the PTM 300 and as aesthetic enhancers. Countertop 354 facilitates customer ease of transaction by providing customer with a hard surface to write on as well as to place small items such as a purse or wallet. A waste receptacle opening 360 provides a convenient and safe place for disposal of any customer trash. An electronic signature pad 356 located on the solid surface countertop 354 in this example allows for customer signature authorization in transactions requiring such.

Figure 19:
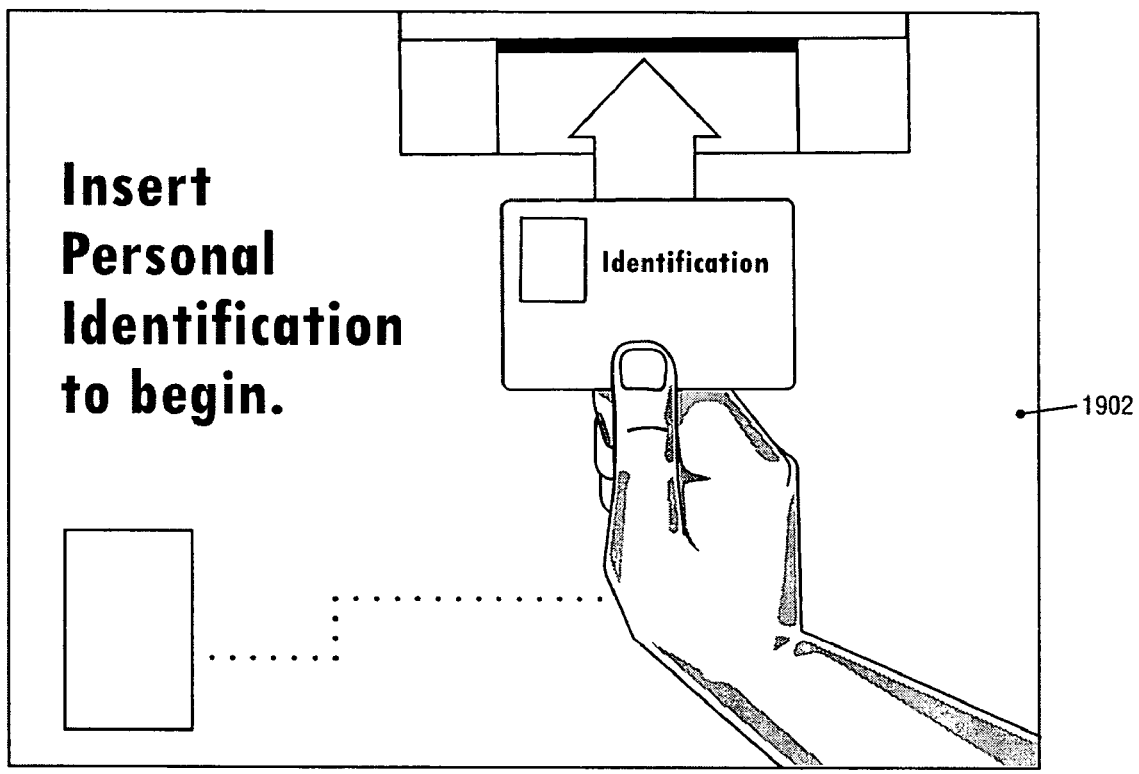
FIG. 19 an exemplary view of the display of a PTM before a customer initiates a transaction.

Other aspects of the PTM 300 include a telephone style handset 364 for audio communication as well as a display screen 368 for video communication and presentation or video confirmation of the transaction. Display screen 368 displays a customer welcome screen 1902, an example of which is shown in FIG. 19, until a customer initiates an identification process or other transaction. A customer identification process can be initiated by customer inserting an identification card into ID scanning slot 366. The customer ID is returned to customer immediately after scanning the ID in through ID return opening 362. The customer can also initiate an identification process by swiping a card in a magnetic card swipe or other suitable manner. The PTM 300 is adaptable to other current and future forms of customer identification including finger print scanning and other biometric identification means.

Customer identification causes PTM 300 to send a call to a centralized call center via the PTM interface, server and caller queue. A teller at the call center accepts the call by selecting the appropriate function key. The teller's acceptance of the call creates audio and/or video links between the customer at the PTM 300 and the teller in the call center. A video image of the customer is generated by camera 370 and a similar camera generates a video image of the teller at the teller station that is transmitted to the PTM 300 and displayed to the customer. Upon creation of the audio and/or video connection between the customer and the teller, display 368 changes from a welcome screen to a customer transaction screen such as shown in FIG. 4.

Figure 4:
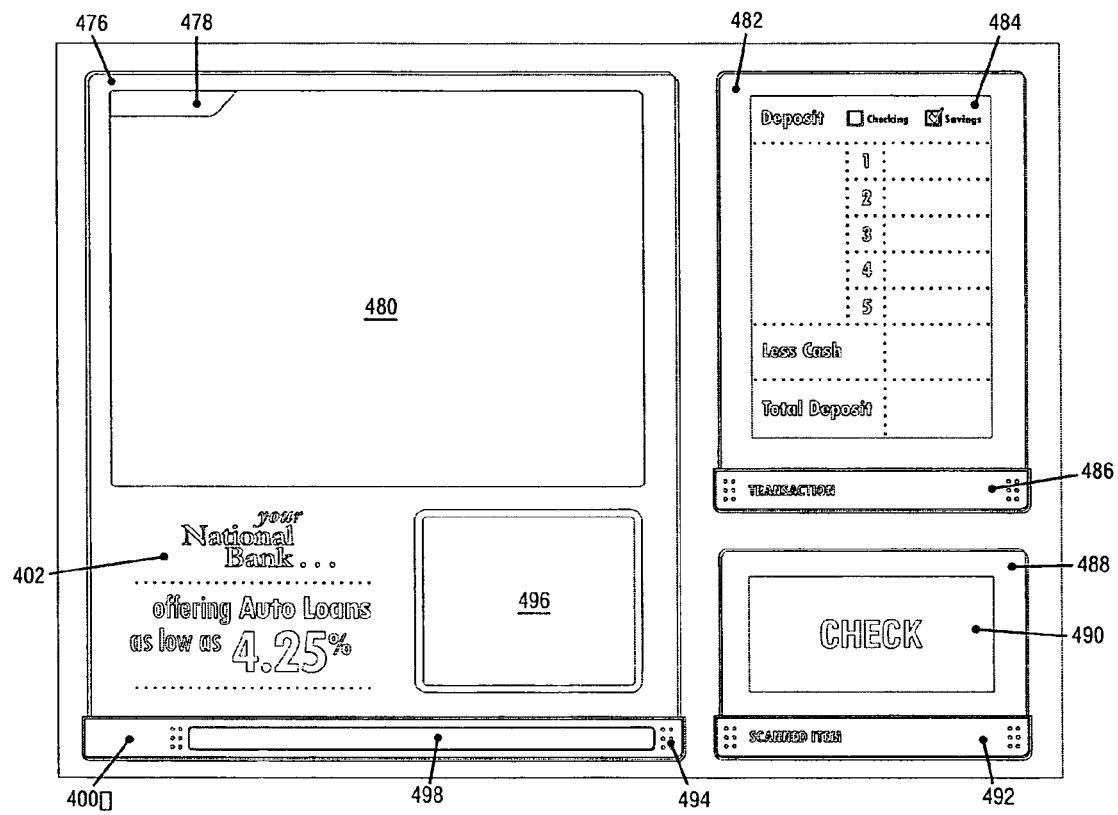
FIG. 4 is a view of a customer transaction screen shown on a display to a customer at a PTM during a transaction.

One example of a customer transaction screen, as illustrated in FIG. 4, is divided into several different presentation windows and areas. Window 476 is the teller and financial institution window and includes several smaller windows. The teller and financial institution window is labeled as such in the title bar 494. Live video images of the teller are shown to the customer on window 496 while a still image of the teller may be shown in a separate still image display window 480. Teller video images are generated by a camera located at the teller station. The teller's name may appear in the name display window 478 to help customers have a greater feeling of personalized service. The financial institution affiliated with the PTM can place advertisements and other marketing messages in the marketing message area 402 of the teller financial institution window 476. The advertisement/marketing messages found in area 402 can be customized for the particular customer using customizing software. The financial institution can place its logo or name in the financial institution name area 400. The scrolling text window 498 may display a variety of scrolling text messages for the customer to view during any waiting periods of the transaction. Scrolling messages could include sports scores, news, stock market listings, advertisements or other information. Other aspects of the customer transaction screen are described in the context of transactions initiated by the customer.

Figure 5:
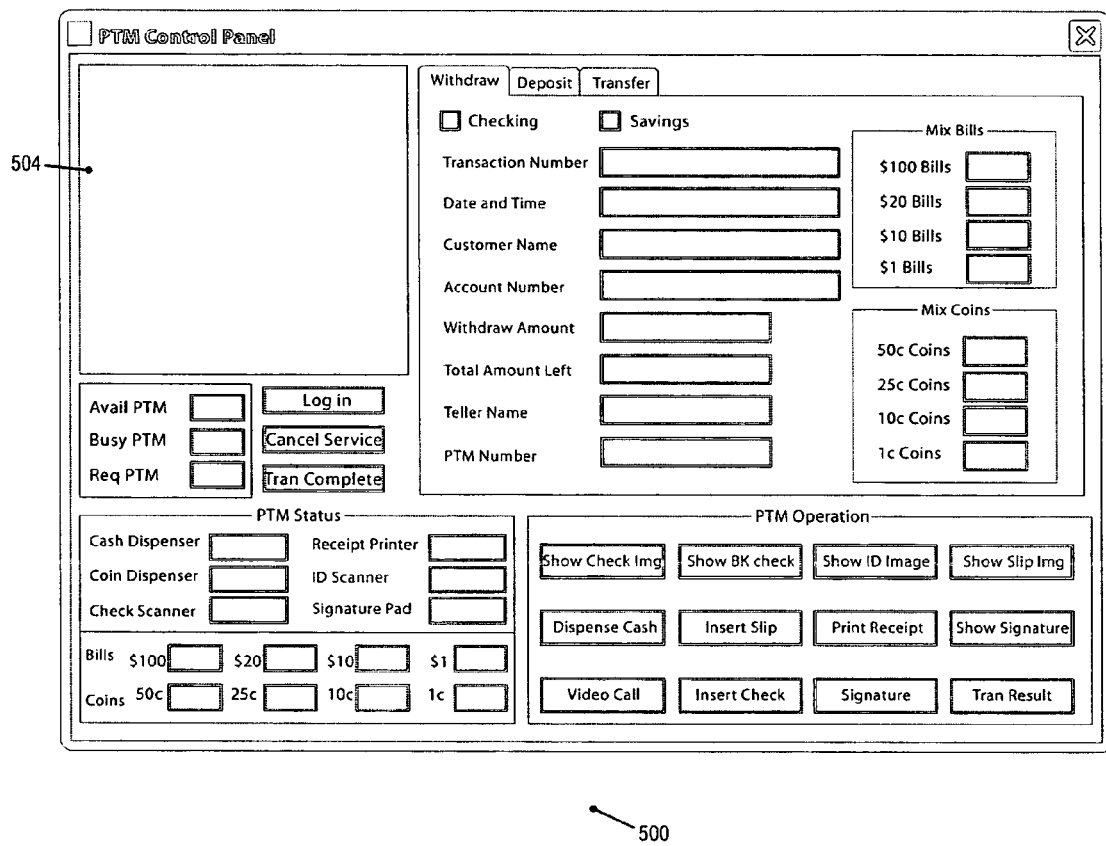
FIG. 5 is a view in detail of a display at the teller station during a transaction that includes a teller transaction screen.

An example of a teller transaction screen 500 is shown in FIG. 5. A video image of customer as generated by a camera 370 is shown to the teller in the live video window 504 of the teller transaction screen 500. The teller transaction screen 500 may be a user interface that enables the teller to select appropriate functions by clicking, for example, on the appropriate button(s). For example, the teller can use the "Mix Bills" buttons and the "Mix Coins" buttons to selectively mix bills and coins to be remotely dispensed to the customer to meet a request of the customer. An image of the customer name and identification can be shown to the teller by teller's selection of the "show ID" function button on the teller transaction screen. This allows the teller to give a personal greeting to the customer upon connection of the audio and video link. The customer uses the handset 364 for audio communication with the teller while the teller audio communication is done using the headset component of the teller station.

Upon establishment of an audio and/or video connection between the teller and customer, the customer may verbally request desired transaction(s). For example, the customer may request the withdrawal of a specified mix of bills and coins. The PTM is capable of performing nearly all over-the-counter type teller transactions including, but not limited to, depositing checks and cash, transference of funds between accounts, withdrawal of funds, and cashing of checks. The teller selects the customer's desired transaction from among the function button of the teller transaction window. In this example, the transaction is controlled by the teller after being initiated by the customer.

Embodiments of the invention enable a connection to be established between geographically dispersed customers and a call center of a service provider. Using this connection, the service provider can remotely provide personal services. A system generally operates as follows. A customer approaches a PTM and identifies himself or herself using identification such as, but not limited to, a ID card, a numeric code, a biometric, and the like.

When the PTM recognizes a customer desires to engage in a transaction, a message is broadcast or a call is made to a central call center. As previously described, the broadcast message or call may be stored on a server that communicates with stations at the call center and with the geographically dispersed PTMs.

Any teller can answer the broadcast message or call. The name of the customer, which was acquired from the ID provided by the customer, is displayed to the teller and makes the transaction more personal. Upon accepting the message or call, a video of the teller is broadcast to the PTM. The video may be streaming video, for example, and may include an audio channel. A similar video and/or audio stream corresponding to the customer is also transmitted or broadcast to the teller. In this manner, the customer and teller are in audio and or video communication. In other words, the PTM sends audio and video data to the teller station and the teller station sends audio and video data to the PTM.

As indicated, the customer can simply speak into a handset or a microphone to identify the service or transaction desired. The teller can verify the transaction at the same time.

Once a transaction is selected, the teller typically controls the flow of the transaction and may request the customer to perform certain actions. For example, the teller can ask the customer to insert a check into a scanner, insert cash into a bill acceptor, and the like. The PTM can make images of various documents including identification and checks and transmit these images to the teller for verification. A signature pad is provided for the customer to sign and provide written verification that they agree with the specifics of the transaction. A receipt is also printed.

At the PTM, a customer transaction screen, which is displayed to the customer, often is configured to reflect the transaction being performed. A deposit, for example, corresponds to a customer transaction screen that includes details of the deposit. The information shown on the customer transaction screen for a withdrawal will be adapted accordingly.

For example, if the customer desires to deposit a check, the teller selects deposit from among the various transaction functions. FIGS. 6 through 18 illustrate exemplary methods for providing personalized banking services and includes exemplary transactions. One of skill in the art can appreciate, however, that embodiments of the invention are not limited to financial transactions and that embodiments of the invention are not limited to a financial institution. Embodiments of the invention may be practiced in other types of services, including, but not limited to, sale of goods and services (tickets, etc.).

Embodiments of the invention often begin by establishing a connection between a customer and a teller such that a personal transaction may occur. In this example, establishing a connection begins when a customer inserts an identification card 601 into a PTM. The PTM generates an image of the identification card 602 and then returns the identification card 603 to the customer. Next, the PTM initiates a call to a central call center 604, typically through a server. As previously described, the call of the customer is often placed in a caller queue at a server and the queue is then served to the tellers at the call center and each call is answered in turn. Next, a teller answers the incoming call 606.

After the call is answered, an audio and/or visual connection is established between the customer and the teller 607. The teller can examiner or validate the identification 608 of the customer by reviewing an image of the identification card sent by the PTM. If the identification card is not valid 609, the procedure is rejected 610 and the call disconnected. If the identification card is valid 609, then the customer can indicate the type of service 611 the customer desires. The customer can inform the teller of the type of service by speaking into the handset, by selecting from a user interface, and the like. In this example, the ability to proceed with a transaction or service is typically controlled by the teller. Thus, a customer can request the service 611 and the teller can select the desired service using a control available, for example, through the teller's control panel 612 (such as the teller transaction screen) or through a user interface.

In the context of banking services, exemplary services or transactions 613 may include, but are not limited to, transfers, withdrawals, check deposits, cash deposits, and check cashing. In other embodiments, one of skill in the art may appreciate other types of transactions including loans or other banking services. Other transactions, depending on the nature of the service provider maintaining the call center can also be performed in accordance with the present invention.

Figure 6:
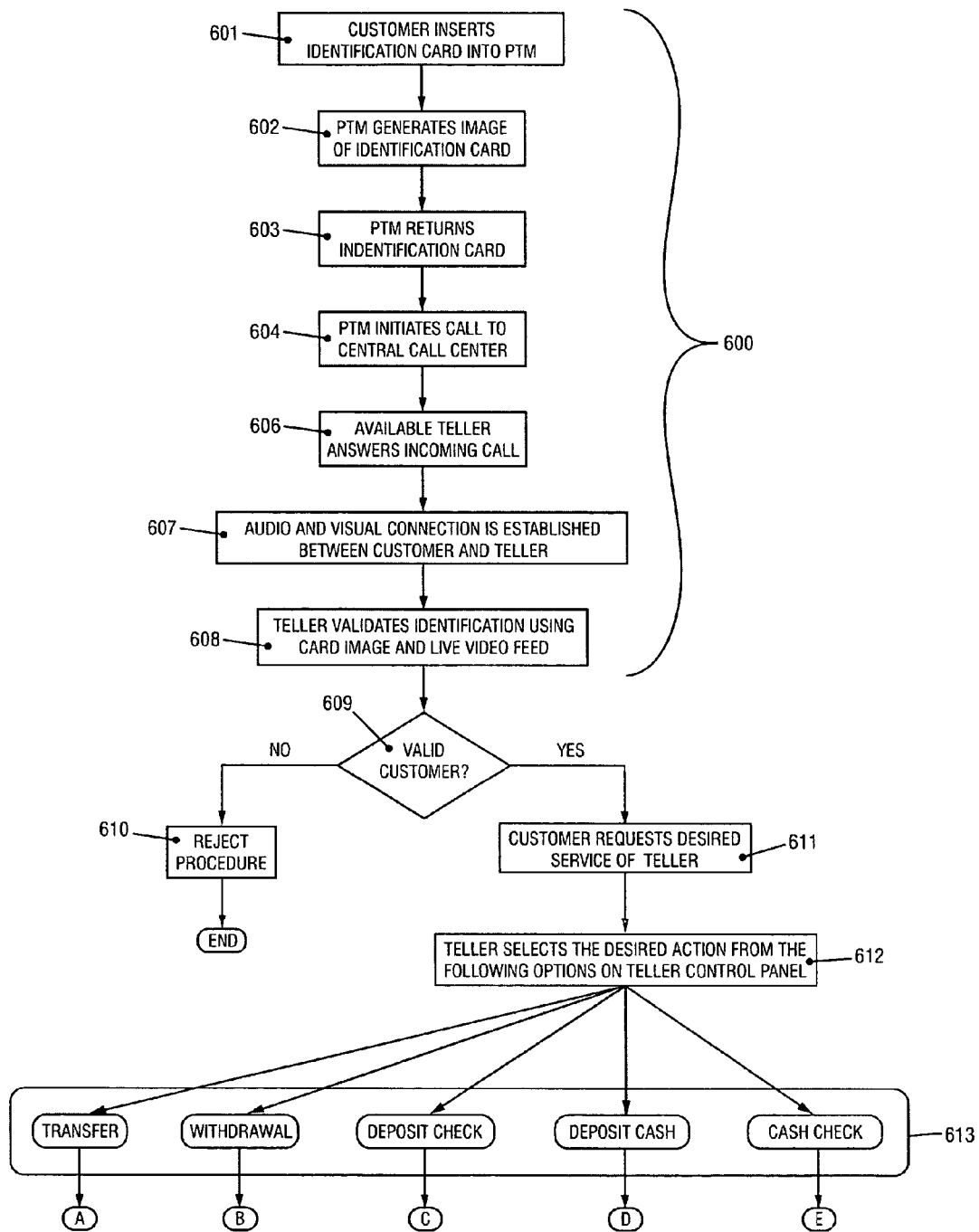
FIG. 6 is a process chart showing the initial steps of various financial transactions using the PTM and includes customer identification.
Figure 7:
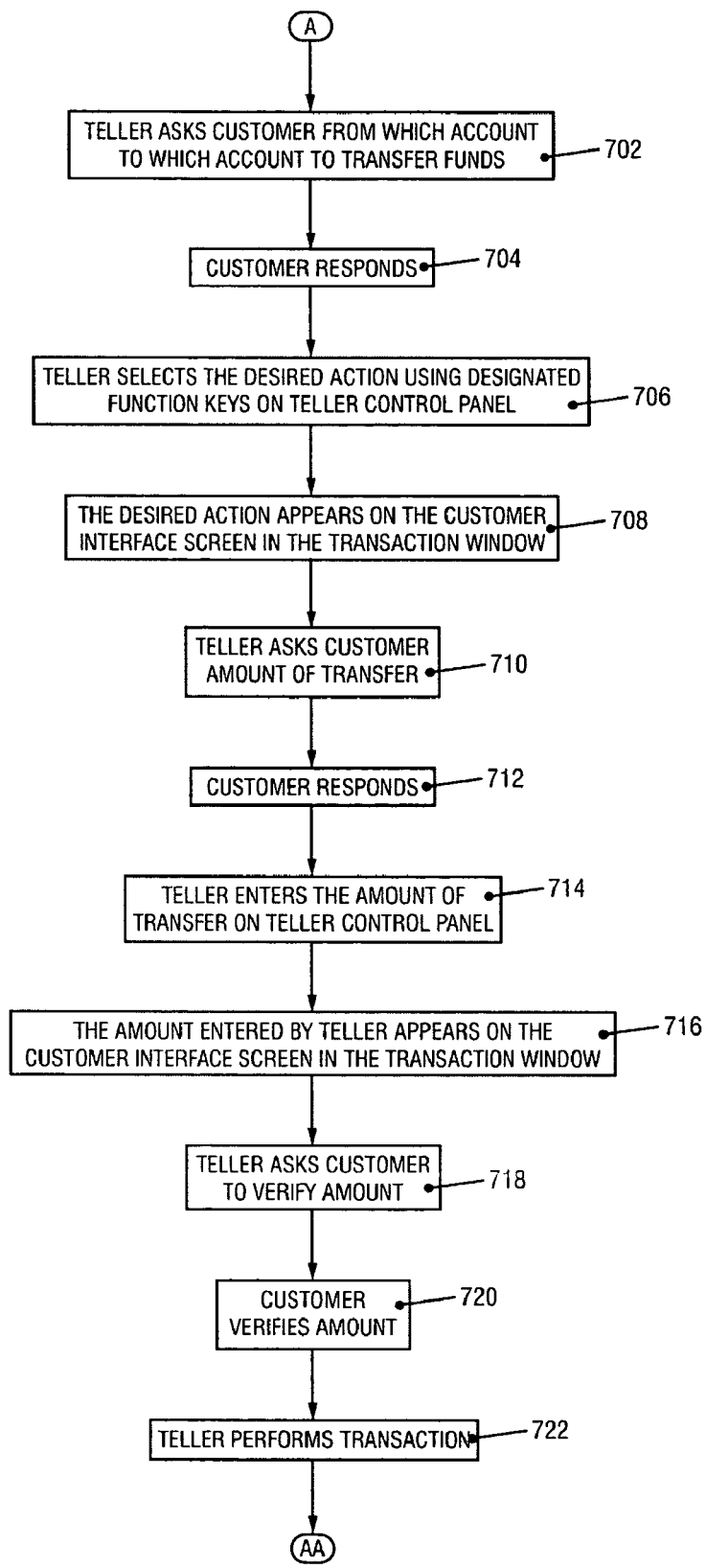
FIGS. 7-8 are a process chart showing an example of a funds transfer transaction shown partially in FIG. 6.
Figure 8:
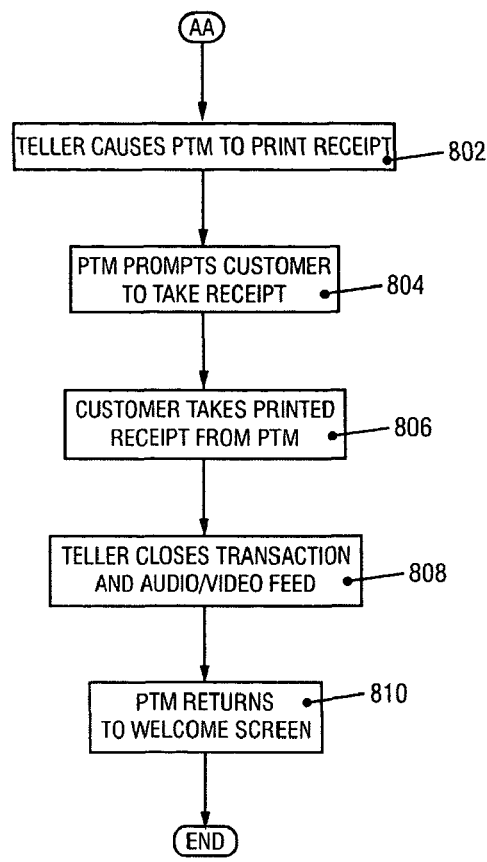
Figure 9:
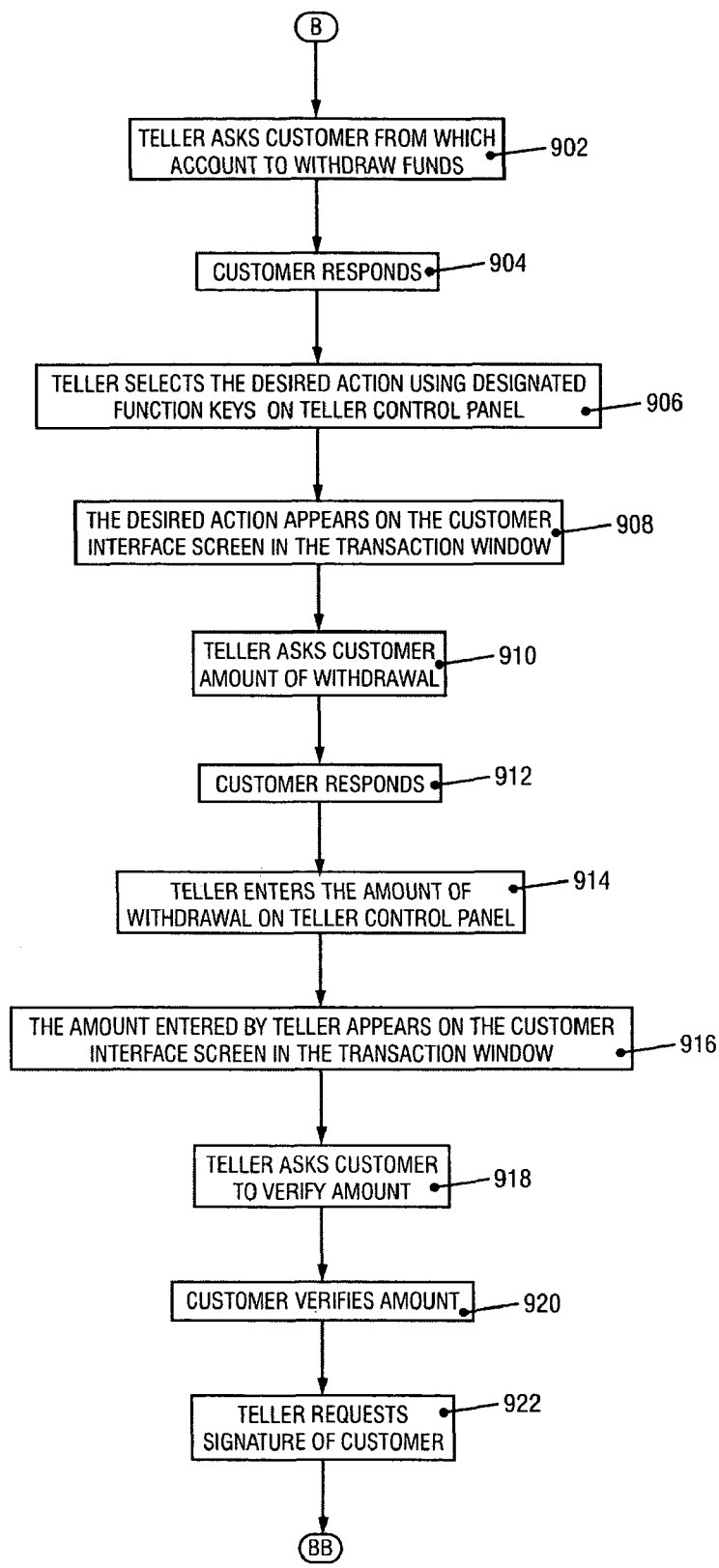
FIGS. 9, 10 and 11 illustrate an example of a withdrawal transaction shown partially in FIG. 6.
Figure 10:
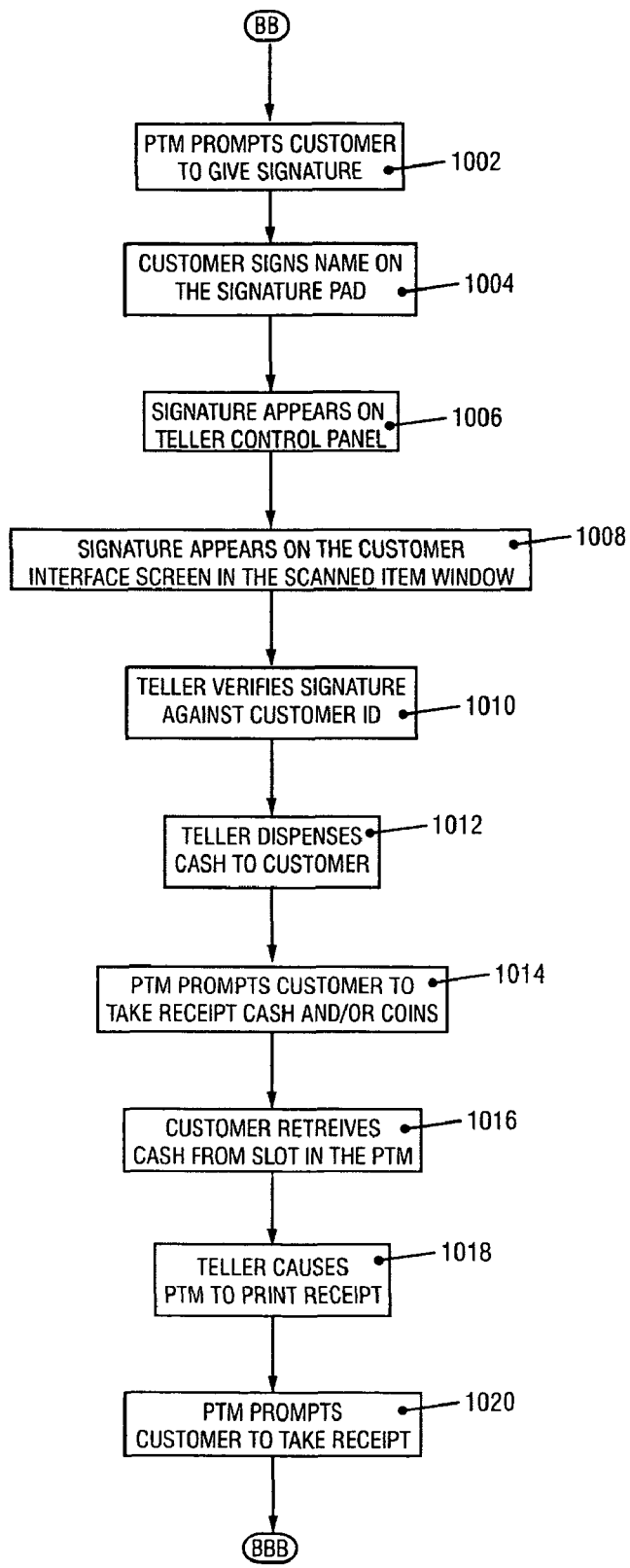
Figure 11:
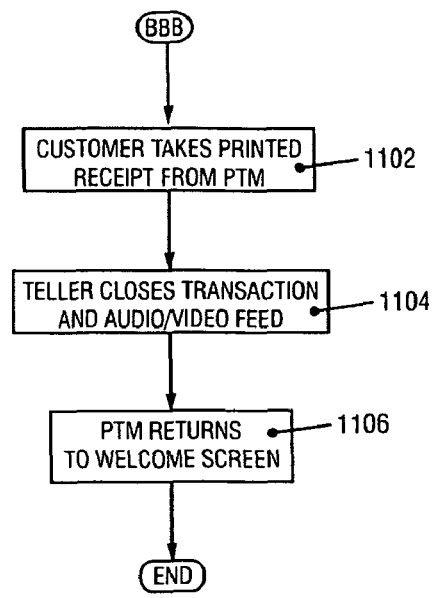
Figure 12:
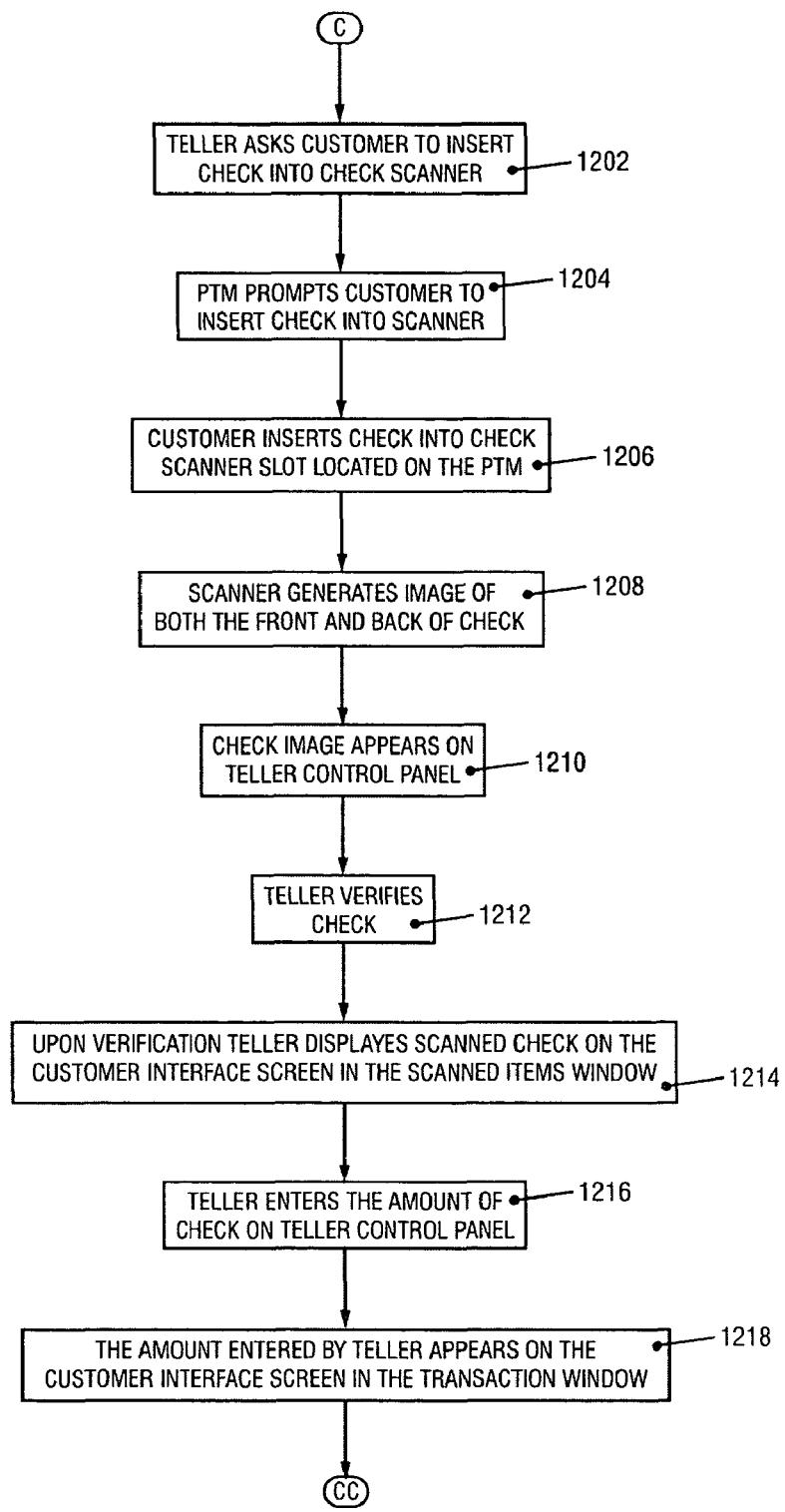
FIGS. 12 and 13 illustrate an example of a check deposit transaction shown partially in FIG. 6.
Figure 13:
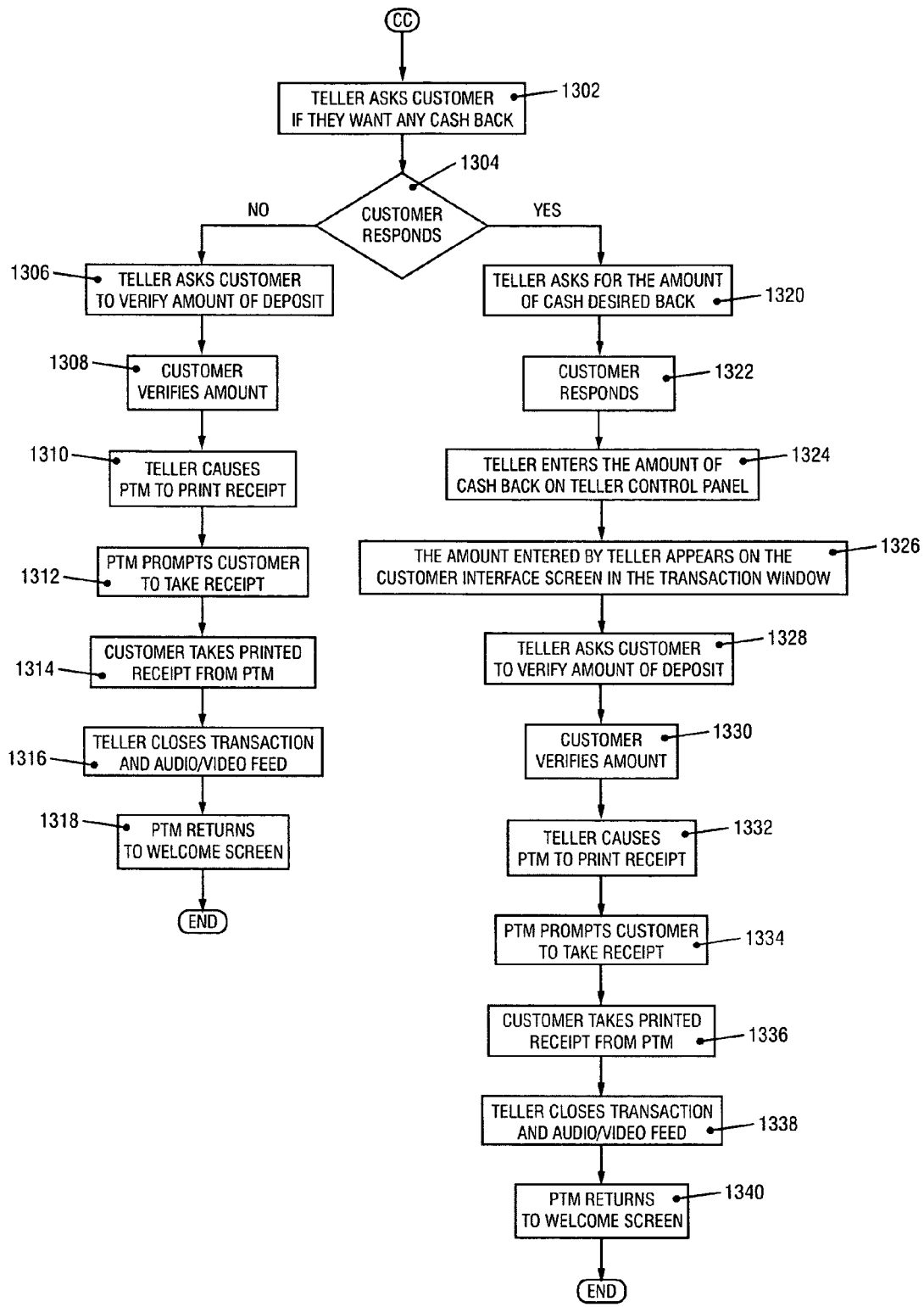

In this example, a process chart of the check deposit transaction is diagramed on FIGS. 6, 12 and 13. A teller asks the customer to insert a check into the check scanner 102 of the PTM and the PTM prompts 1204 the customer to insert the check. A customer inserts check 1206 into check scanner slot 358 (see FIG. 3) and a scanner generates an image of both the front and back of the check 1208. The check is than retained in the PTM for further processing. The image of the check is transmitted to the teller 1210 and the teller can view image of scanned check by selecting a "show check" function. Selection of the show check function button causes a window to open showing the image of both the front and back of the scanned check. This allows the teller to verify the amounts and signature of the check 1212. If the customer used the scanned ID method of identification then the teller can verify customer signature on the endorsed check against the scanned ID image. The customer can also view the scanned check 490,(see FIG. 4) or other scanned item, in the scanned item window 488 of the customer transaction screen. Often, the scanned check is displayed on the customer interface screen in the scanned items window 1214. The scanned item window is labeled as such in the scanned item window title bar 492.

Selection of the desired transaction by the teller causes the appropriate transaction slip 484 to appear in the transaction slip window 482 of the customer transaction screen. The transaction slip window is labeled as such in the transaction slip title bar 486. After viewing the amount on the check, the teller can verify amount with the customer and then enter the appropriate amount on the appropriate transaction form shown in the teller transaction 1216. The values entered in the form by the teller appear on the customer deposit slip 484 to allow the customer visual verification of the amount on the customer transaction screen and to follow the transaction process 1218.

The customer then has the opportunity to request cash back 1302 from the deposited check. If the customer does request cash back, the teller asks for the amount and optionally a specified mix of cash desired back 1320 and enters the amount on the transaction form when the customer responds 1322. The teller enters the amount of cash back 1324 on the control panel or using the teller transaction screen and the amount shows on the customer transaction screen 1326. The teller then requests verify the amount 1328, 1330 and then asks that customer sign the electronic signature pad 356 for authorization of the requested cash. The customer's signature appears in the scanned item window 488 of the customer transaction screen as well as on the teller transaction screen. After the customer's signature is received, the teller can dispense cash, which may include a specified mix of cash, by selecting the "dispense cash" button on the teller transaction window. Dispensed cash appears in the cash dispensing slot 352 and the PTM still image window 480 then displays a customer reminder to pick up the dispensed cash. The teller causes the PTM to print a receipt 1332. The PTM prompts the customer to take the receipt 1334. The customer takes the receipt from the PTM 1336. The teller closes the transaction including at least the audio and/or video feed 1338. The PTM returns to a welcome screen 1340.

If the customer does not desire cash back 1304 then the transaction process would continue as follows. The teller would ask the customer to verify all transaction details including the amount of deposit 1306. Upon customer verification of the transaction details 1308, the teller can complete the transaction by selecting the appropriate function keys from the teller station keyboard. Customer then has the option of requesting further transactions of the teller. If customer does request further transactions, teller then performs the requested transactions.

Upon completion of the last requested transaction teller causes a receipt 1310 containing all of the transactions by selecting the print receipt function button from the teller transaction screen. Receipt is printed and appears in receipt slot 348 for customer pick-up. PTM then displays customer reminder to pick up receipt 1312 in the still image display window 480. The customer then takes the printed receipt 1314 and the teller closes the transaction. Closing of the transaction by the teller causes the video and audio connection between the PTM and the teller station to be closed 1316. Upon the closing of the transaction, the PTM display screen 368 returns to its initial welcome display 1318.

Cashing of a check is similar to depositing a check, with one difference being that all of the check's value is returned to the customer. The process of a check cashing transaction is diagrammed beginning in FIG. 6 and continuing on FIGS. 16, 17, and 18. The PTM enables a customer to cash a highly diverse range of check values including cashing checks to the exact amount. This is accomplished using a coin dispenser. Coins are dispensed into coin compartment 350.

In a check cashing transaction, the teller asks the customer to insert a check into a check scanner 1602. The customer inserts the check into the check scanner slot 1604. A scanner generates an image of both the front and back of the check 1606. A check image is transmitted to the teller and displayed on the teller transaction screen 1608 or control panel. The teller verifies the check 1610.

After verification, the teller displays the scanned check on the customer interface screen 1612. The teller enters the amount of the check using the control panel 1614. The amount entered by the teller appears on the customer transaction screen and on the teller transaction screen 1616. The teller has the customer verify the amount 1618 and the customer verifies the amount 1620.

Next, the teller requests the customer's signature 1702 and the PTM prompts the customer for the signature 1704. The customer signs on the signature pad 1706 and the signature appears on the teller transaction screen 1708. The signature may also appear on the customer interface screen 1710. The teller may verify the signature against the customer's ID 1712. Then, the teller causes the PTM to dispense cash 1714 and the PTM prompts the customer to take the cash 1716. After the customer retrieves the cash from the PTM 1718, the teller causes the PTM to print a receipt 1802. The PTM prompts the customer to take the receipt 1804 and the customer takes the receipt 1806. The teller then closes the transaction as well as the audio and/or video links 1808 and the PTM returns to the welcome screen 1810.

Figure 14:
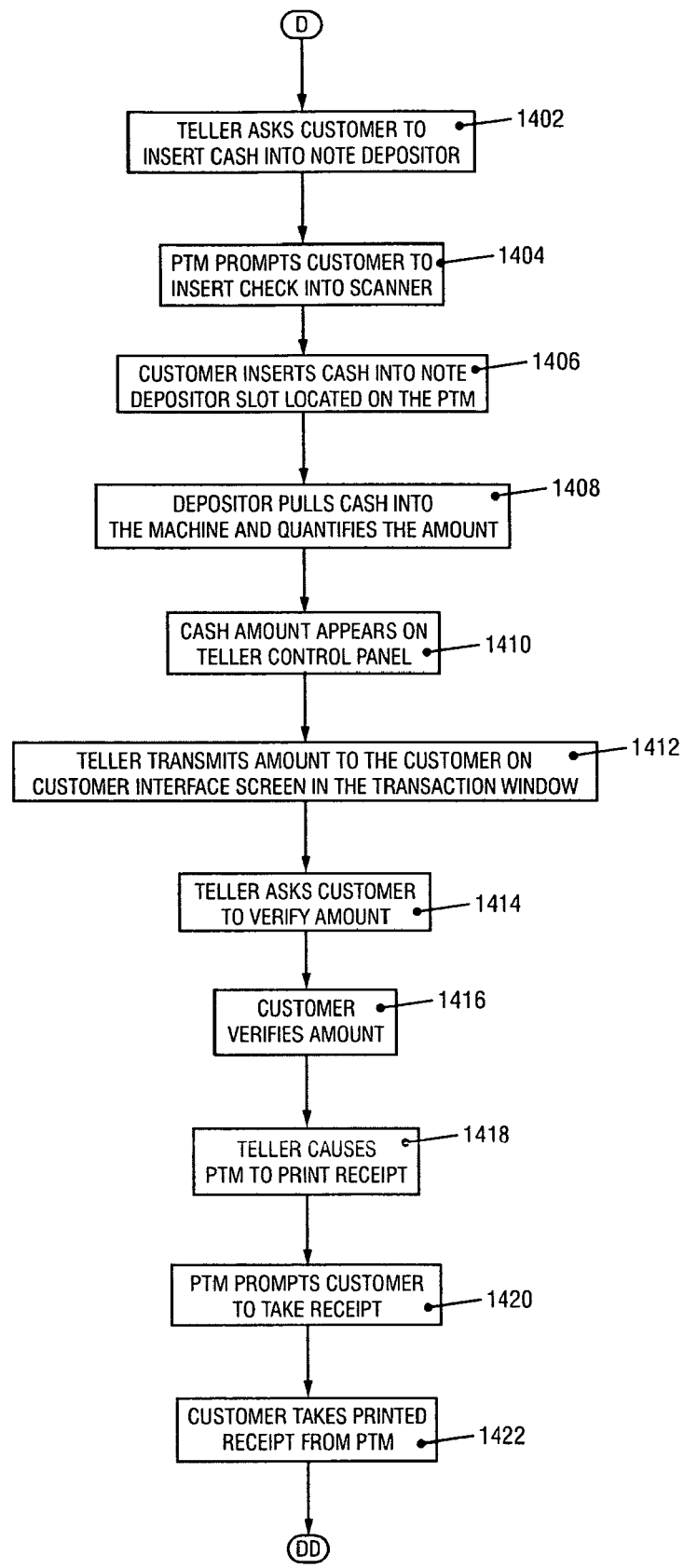
FIGS. 14 and 15 illustrate an example of a cash deposit transaction shown partially in FIG. 6.
Figure 15:
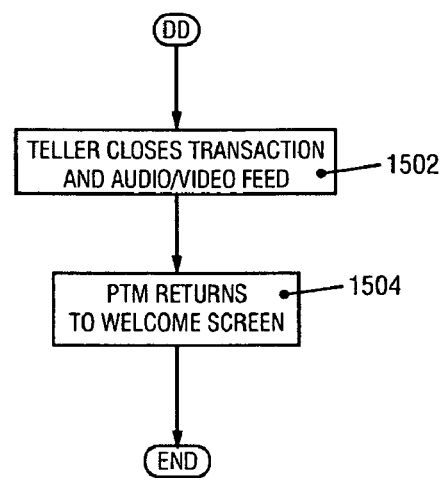
Figure 16:
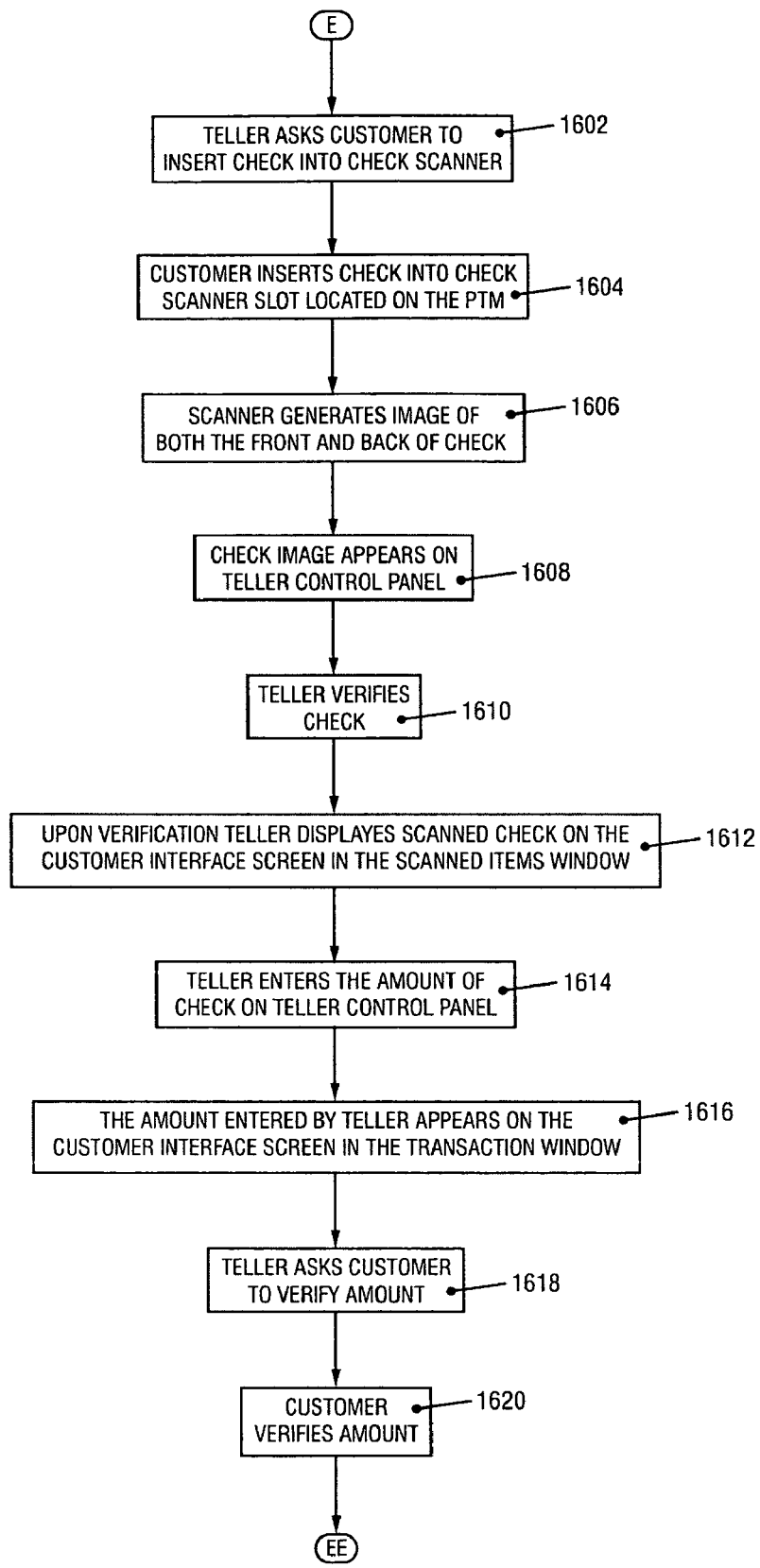
FIGS. 16, 17, and 18 illustrate an example of check cashing transaction shown partially in FIG. 6.
Figure 17:
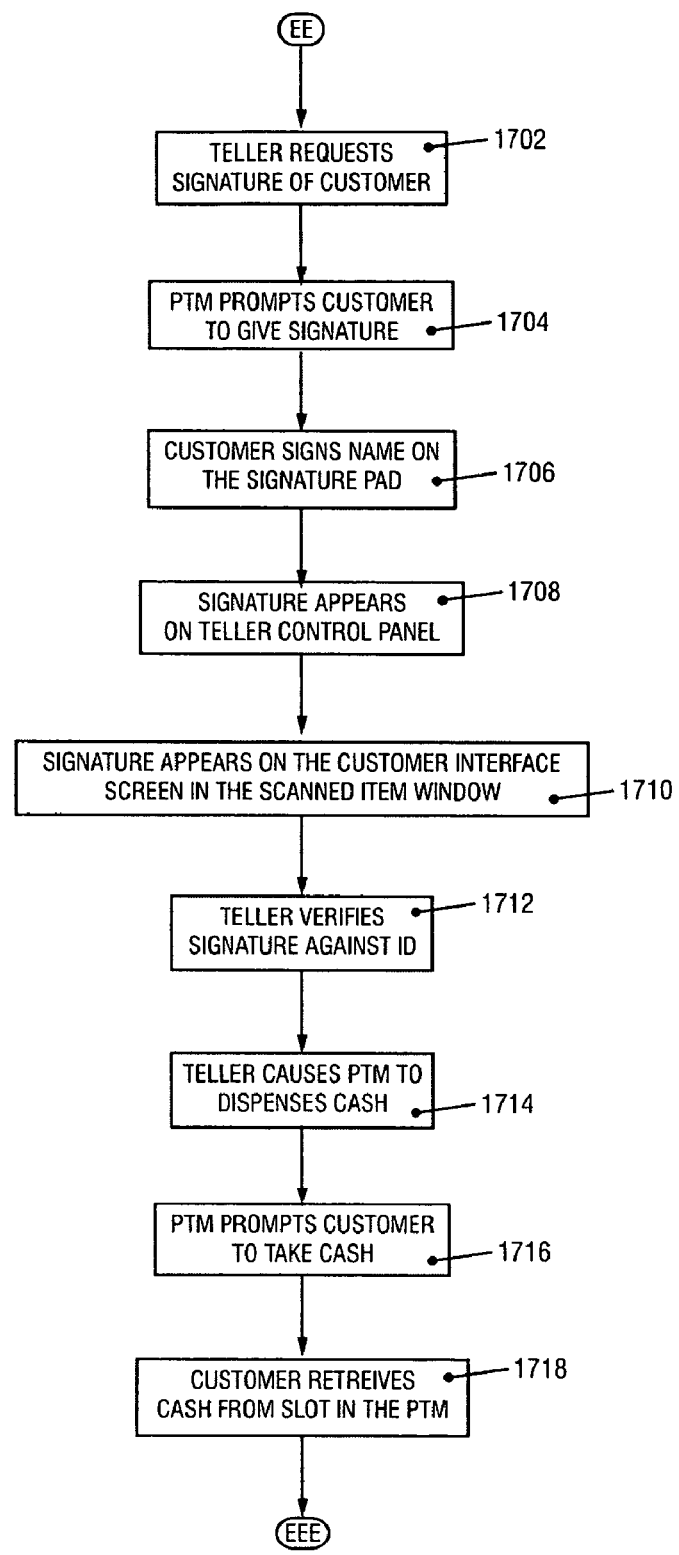
Figure 18:
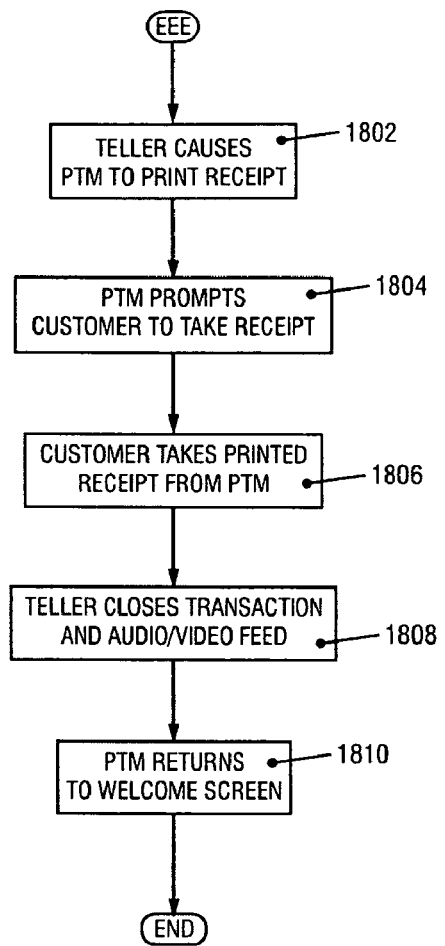

A process chart diagramming a cash deposit transaction is shown beginning in FIG. 6 and continuing in FIGS. 14 and 15. After customer identification procedure and selection of the a cash deposit transaction as described previously, the teller asks the customer to insert cash into the note depositor 1402 and the customer inserts cash 1406 into PTM via a bulk bill acceptor slot. The bulk bill acceptor allows for single and multiple quantities of bills to be inserted into the PTM for deposit all at once. The bulk bill acceptor quantifies the dollar value of the bills 1408 and communicates this value to the teller via the server 1410. Teller than verifies this value with the customer and the causes the amount to display on the customer transaction screen 1412.

Similar to the check deposit transaction, a deposit slip 484 would show in the customer transaction slip window 482 and the values entered by the teller would appear on the deposit slip 484. The teller asks the customer to verify the amount of the deposit 1414. After verification by the customer 1416 of the deposit amount, teller then completes the transaction. The customer then has the option of requesting further transactions of the teller. If customer does request further transactions, teller then performs the requested transactions.

Upon completion of the last requested transaction, the teller causes a receipt containing all of the transactions performed with the customer to be printed 1418 for the customer by selecting the print receipt function button from the teller transaction screen. The receipt is printed and appears in receipt slot 348 for the customer. PTM then displays a customer reminder to pick up the receipt 1420 in the still image display window 480. The customer takes the printed receipt 1422 and the teller closes the transaction 1502. Closing of the transaction by the teller causes the video and audio connection between the PTM and the teller station to be closed. Upon the closing of the transaction the PTM display screen 368 returns to its initial welcome format 1504.

A funds transfer transaction begins with the customer identification procedure previously described. A process chart diagramming a funds transfer transaction is shown transfer funds and the account to which he wishes to transfer funds. The customer responds 704 and the teller selects the desired action using appropriate function keys 706. The funds transfer transaction slip appears 708 in the customer transaction slip window 482 of the customer transaction screen. The customer informs the teller 710, 712 of the desired amount of transfer and the teller enters values onto the transaction form 714. The customer can view and verify amounts 716 on the customer transaction slip 384. After the customer verifies the transfer amount to the teller 718, 720 and both the origination and destination accounts are correct, the teller performs the transaction 722. The customer then has the option of requesting further transactions of the teller. If the customer does request further transactions, the teller then performs the requested transactions. Otherwise, the teller causes the PTM to print a receipt 802. The PTM prompts the customer to take the receipt 804. After the customer takes the printed receipt from the PTM 806, the teller closes the transaction 808, which ends the audio and/or video links, and the PTM returns to the welcome screen 810.

A withdrawal transaction begins with the standard customer identification procedure previously described. An example of a withdrawal transaction begins on FIG. 6 and continues to FIGS. 9, 10, and 11. After the customer identification is complete, the customer selects the account from which he or she wishes to withdraw funds 900, 902. The teller selects the desired action 906 from the function keys. The withdrawal slip appears 908 in the customer transaction slip window 482. The teller asks the customer the amount of the withdrawal 910 and the customer informs 912 the teller of the desired amount of the withdrawal. The teller verifies the availability of funds and enters value onto a transaction form.

The teller enters the amount of the withdrawal 914 and the amount appears on the customer interface screen and/or on the teller interface screen 916. The customer can view and verify amounts on the customer transaction slip 384. The teller then requests that the customer sign 922 the electronic signature pad 356 for authorization of the requested cash. The PTM prompts the customer for the signature 1002 and the customer signs his or her name on the signature pad 1004. The customer's signature appears 1008 in the scanned item window 488 as well as on the teller's transaction screen. After the customer's signature is received, the teller verifies the signature against the customer's ID 1010. The teller can dispense cash 1012 by selecting the "dispense cash" function from the teller transaction window. Dispensed cash appears in the cash dispensing slot 352 and the PTM still image window 480 then displays a customer reminder 1014 to pick up the dispensed cash. The customer retrieves the cash 1016 and the customer then has the option of requesting further transactions of the teller. If customer does request further transactions, teller then performs the requested transactions. Otherwise, the teller causes the PTM to print a receipt 1018 and the PTM prompts the customer to take the receipt 1020. The customer takes the receipt 1102 and the teller closes the transaction 1104 as well as the audio/video links or feeds. The PTM returns to the welcome screen 1106.

The systems and methods described herein provide a fast, efficient, and personalized means for performing financial transactions. Embodiments of the invention allow for nearly all walk-up-teller type transactions while maintaining a personal transaction feel. At the same time, the costs associated with staffing a financial institution are reduced. Costs are reduced, for example, because the tellers are consolidated at a call center. Fewer tellers are required to service more customers. The tellers are likely to be more efficient because they are serving a greater geographical area and are less likely to experience periods when no customers are present, as may occur at branch locations.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A system for connecting remote customers to a service provider to provide personal interactive banking services, including withdrawals, cash and check deposits, funds transfers, and cashing of checks, to the remote customers, the system comprising:

plurality of personal teller machines located in at least one location remote from a call center, each personal teller machine programmed to both send and receive at least one of audio data and video data, wherein each personal teller machine comprises an electronic signature pad, and a keypad, and wherein the at least one personal teller machine is programmed to receive and store cash and checks from a customer, dispense currency, including at least bills and individual coins, to a customer, and allow a customer to select and perform banking services using the keypad;

a plurality of teller stations located in the call center, each teller station of the plurality of teller stations being programmed to both send and receive at least one of audio data and video data from each personal teller machine, wherein each teller station of the plurality of teller stations:

is integrated with a financial banking institution's system and programmed to access, by a teller, an account owned by the customer and verify the account balance, transfer funds to or from the account, withdraw funds directly from the account, and deposit funds directly into the account, is programmed to display a signature entered remotely on the electronic signature pad at each personal teller machine and display a customer identification, is programmed to remotely control, by a teller, the dispersal of a predetermined amount of currency from each personal teller machine, is programmed to selectively mix, by a teller, bills and individual coins to be remotely dispensed to the customer at a personal teller machine of the plurality of personal teller machines in response to a request of the customer made at the personal teller machine; and at least one server connected with the plurality of personal teller machines and the plurality of teller stations, wherein the at least one server is programmed to connect the personal teller machine in at least one of audio communication and video communication with a particular teller station of the plurality of teller stations at teller station the call center.

2. A system as defined in claim 1, wherein the personal teller machine is programmed to be controlled by the particular teller station.

3. A system as defined in claim 1, wherein the particular teller station is connected with the at least one server over a network.

4. A system as defined in claim 1, wherein the personal teller machine is connected with the at least one server over a network.

5. A system as defined in claim 1, wherein the personal teller machine comprises:

a camera to generate the video data that is transmitted to the particular teller station; and a handset to audibly communicate with the particular teller station.

6. A system as defined in claim 5, wherein the personal teller machine further comprises:

a monitor that displays a customer transaction screen;

a card reader;

a check accepter;

a cash accepter;

a receipt printer;

a scanner;

a coin dispenser;

a scanner; and a bill acceptor.

7. A system as defined in claim 1, wherein each teller station of the plurality of teller stations comprises:

a display for showing a teller transaction screen;

function keys for selecting transactions;

a headset for both receiving and sending audio data to the personal teller machine; and a camera for sending video data to the personal teller machine.

8. A system as defined in claim 1, wherein the personal teller machine displays a customer transaction screen that is controlled by the particular teller station and is programmed to display a particular transaction requested by the personal teller machine.

9. A method for providing personalized interactive banking services, such as withdrawals, cash and check deposits, funds transfers, and cashing of checks, to remote customers from a call center, the method comprising:

receiving a call from a personal teller machine of a plurality of personal teller machines associated with a financial banking institution, the call initiated by a customer;

determining that a particular teller machine of a plurality of teller machines located remotely from the personal teller machine is available to receive the call;

receiving an acceptance of the call from a the particular teller machine at a call station, the particular teller machine at the call station being associated with the financial banking institution;

connecting the personal teller machine with the particular teller machine, wherein a customer at the personal teller machine has audio and video communication with a teller at the teller machine;

receiving and storing currency from the customer at the personal teller machine;

verifying the validity of the currency received and stored at the personal teller machine remotely from the particular teller machine by verifying a customer signature entered remotely on an electronic signature pad at the personal teller machine against customer identification information at the particular teller machine;

verifying, at the particular teller machine, information or a banking selection entered by the customer on a keypad at the personal teller machine; depositing electronically at least a portion of the currency received at the personal teller machine directly into an account owned by the customer at the financial banking institution, the deposit being performed by a teller at the particular teller machine;

receiving a request from the customer at the personal teller machine for a withdrawal of a specified mix of bills and individual coins;

selecting at the particular teller machine one or more buttons to selectively mix one or more of $100.00 bills, $20.00 bills, $10.00 bills, $1.00 bills, and to selectively mix one or more individual 500 coins, 250 coins, 100 coins, or 10 coins to meet the request of the customer; and selecting at the particular teller machine one or more buttons to remotely cause the personal teller machine to disperse the selectively mixed bills and individual coins to the customer at the personal teller machine.

10. A method as defined in claim 9, further comprising performing one or more additional transactions identified by the customer.

11. A method as defined in claim 10, wherein the currency comprises a check and wherein performing one or more additional transactions identified by the customer further comprises receiving a check from the customer and scanning a front and back of the check.

12. A method as defined in claim 11, wherein performing one or more additional transactions identified by the customer further comprises transmitting an image of the check to the particular teller machine.

13. A method as defined in claim 10, wherein performing one or more additional transactions identified by the customer further comprises transmitting an image of an ID of the customer that is scanned by the personal teller machine.

14. A method as defined in claim 10, wherein performing one or more additional transactions identified by the customer further comprises a teller at the particular teller machine verifying a balance in an account of the customer by accessing the banking system of the financial banking institution.

15. A method as defined in claim 9, wherein receiving a call from a personal teller machine further comprises storing the call in a caller queue.

16. A method as defined in claim 15, further comprising serving each call in the caller queue in turn to one or more teller stations at the call center.

17. A method as defined in claim 9, further comprising controlling by a teller each transaction from a teller machine.

18. A method as defined in claim 9, further comprising terminating the audio and video communication when the transaction is over.

19. An interactive financial service system for allowing personal interactive banking services, financial services, and transactions, including withdrawals, cash and check deposits, funds transfers, and cashing of checks, to be performed by a financial service representative located in a centralized call center for a customer at a remotely located personal teller machine, the system comprising:

a plurality of personal teller machines for performing transactions, wherein the plurality of personal teller machines are geographically dispersed and are programmed to connect with a network when a customer initiates a transaction, each personal teller machine being further programmed to:
identify a customer of the personal teller machine;
receive cash from the customer;
receive documents including checks from the customer;
generate images of each side of the documents;
dispense selectively mixed cash to the customer;
dispense a receipt to the customer;
allow a customer to select and perform banking services; and each personal teller machine comprising:
a camera programmed to generate video data of the customer, wherein the video data is displayed on the teller machine;
a display programmed to view video and still images, the video including video data of a teller at the teller station;
an electronic signature pad programmed to receive a signature from the customer;
a keypad programmed to select and perform banking services;
a telephone handset programmed to communicate audibly with the teller; and
an interface programmed to connect and communicate with said teller station via the at least one server over the network; and a plurality of teller stations located at a call center, wherein each teller station of the plurality of the one or more teller stations is programmed to display a signature entered remotely on the electronic signature pad at the a personal teller machine, display an image of a customer identification, and programmed to remotely control, by a teller, the dispersal of cash to the customer at each personal teller machine and to selectively mix the number of one or more of $100.00 bills, $20.00 bills, $10.00 bills, $1.00 bills, 500 coins, 250 coins, 100 coins, or 10 coins to be remotely dispensed to the customer at each personal teller machine and cause a specified mix of individual coins to be dispensed from a selected personal teller machine, each teller station comprising:
at least one server computer that is connected with each teller stations over the network and is programmed to connect each teller station with the plurality of personal teller machines over the network;
wherein each teller stations is integrated with a financial banking institution's system and programmed to access, by a teller, an account owned by the customer, verify the account balance, transfer funds to or from the account, withdraw funds directly from the account, and deposit funds directly into the account.

20. A system as defined in claim 19, wherein each personal teller machine further comprises a computer.

21. A system as defined in claim 19, wherein each teller station causes details regarding a particular transaction to be displayed on the display to the customer.

22. A system as defined in claim 19, each personal teller machine further comprises at least one of:
 a biometric device;
 a card scanner for reading a magnetic strip; and
 a scanner that scans each side of a customer's identification for transmission to a teller station that displays an image of the customer's identification.

23. A system as defined in claim 19, wherein each teller station further comprises:
 a headset for receiving audio communications from the customer;
 a display for displaying video data of the customer;
 a teller transaction screen for displaying details of each transaction performed by the customer; and
 function keys for controlling each transaction.

* * * * *

UNITED STATES PATENT AND TRADEMARK OFFICE
CERTIFICATE OF CORRECTION

PATENT NO. : 7,814,016 B2
APPLICATION NO. : 10/880849
DATED : October 12, 2010
INVENTOR(S) : Pranger Page 1 of 2

It is certified that error appears in the above-identified patent and that said Letters Patent is hereby corrected as shown below:

Column 1
Line 27, after "have" remove [of]
Line 31, change "ATM's" to --ATMs--
Line 32, change "customers" to --customer's--
Line 33, change "ATM's" to --ATMs--
Line 52, change "personal/one" to --personal one--
Line 56, change "works" to --words--

Column 3
Line 31, after "example of" insert --a--
Line 33, before "an exemplary" insert --is--

Column 4
Line 4, after "tellers" insert --are--
Line 36, change "locations," to --locations.--
Line 39, change "finds transfers" to --funds transfers--
Line 62, after "cash dispenser 214," insert --a coin dispenser 216,--
Line 66, change "not" to --note--

Column 5
Line 2, change "remote perform" to --perform remote--
Line 34, change "customer with" to --customers with--
Line 49, after "by" insert --a--
Line 51, change "to customer" to --to the customer--

Column 6
Line 30, change "of customer" to --of a customer--
Line 39, change "by teller's" to --by the teller's--
Line 64, change "a ID" to --an ID--

Signed and Sealed this
Seventh Day of June, 2011

David J. Kappos
*Director of the United States Patent and Trademark Office*

Column 7
Line 61, change "examiner" to --examine--

Column 8
Line 17, change "diagramed" to --diagrammed--
Line 18, change "scanner 102" to --scanner 1202--
Line 22, change "than" to --then--
Line 24, change "view image of" to --view the image of the--
Line 43, change "verify amount" to --verify the amount--
Line 58, change "requests verify" to --requests to verify--
Line 59, change "customer sign" to --customer to sign--

Column 9
Line 67, after "of the" remove [a]

Column 10
Line 8, change "than" to --then--
Line 9, change "and the causes" to --and then causes--
Line 36, change "transfer funds" to --transfer funds 702--
Line 61, change "withdraw funds 900, 902" to --withdraw funds 902, 904--
Line 67, change "enters value" to --enters the value--

Column 11
Line 9, change "appears 1008" to --appears 1006, 1008--
Line 50, before "plurality" insert --a--

Column 13
Line 7, change "from a the" to --from the--
Lines 37-38, change "500 coins, 250 coins, 100 coins, or 10 coins" to --50¢ coins, 25¢ coins, 10¢ coins, or 1¢ coins--

Column 14
Lines 49-50, change "the a personal" to --the personal--
Lines 55-56, change "500 coins, 250 coins, 100 coins, or 10 coins" to --50¢ coins, 25¢ coins, 10¢ coins, or 1¢ coins--
Line 62, change "stations" to --station--
Line 65, change "stations" to --station--